May 29, 1928.
G. A. ROBERTSHAW
1,671,782
FUSIBLE SAFETY DEVICE
Filed Nov. 24, 1924
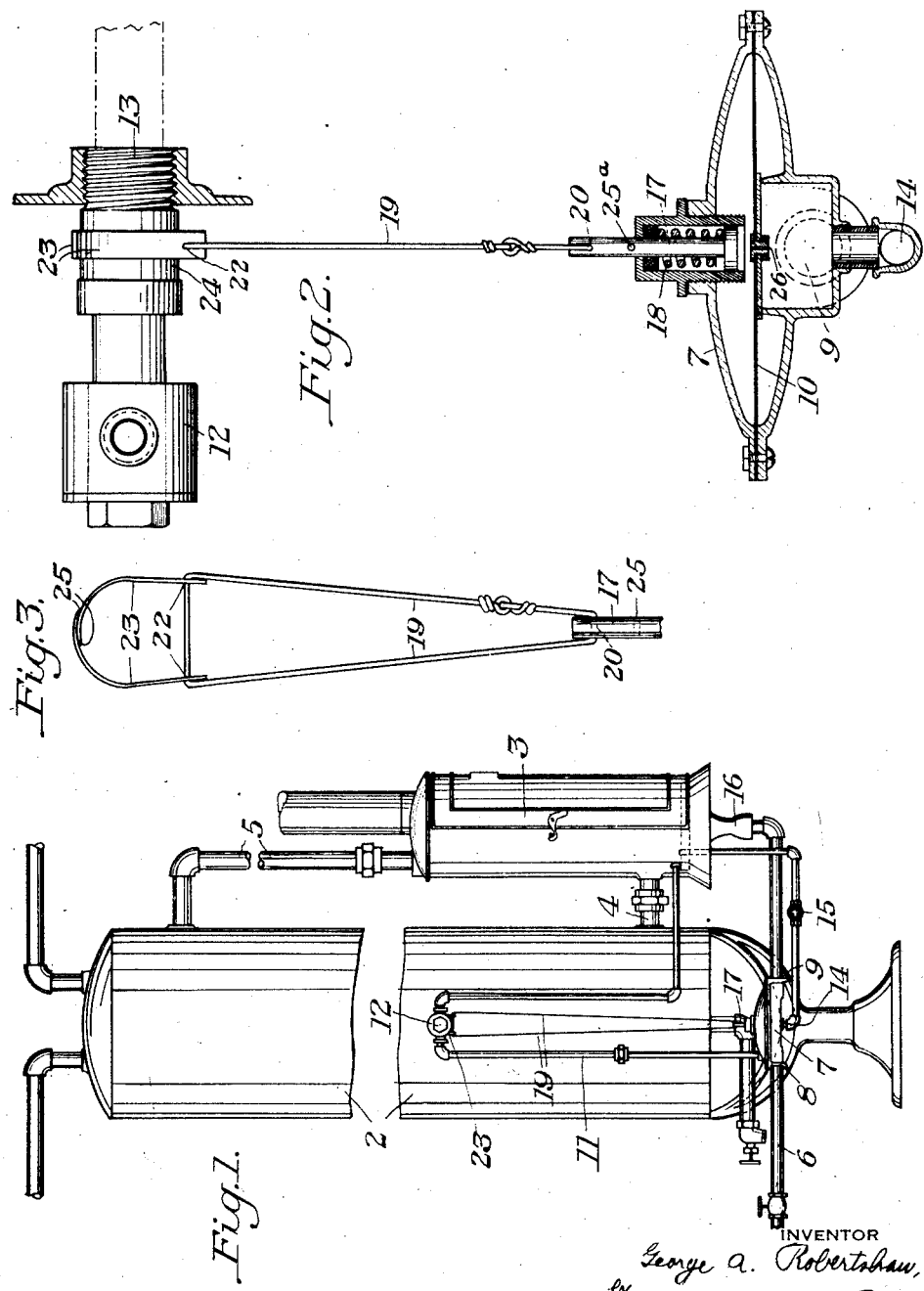

Patented May 29, 1928.

1,671,782

UNITED STATES PATENT OFFICE.

GEORGE A. ROBERTSHAW, OF GREENSBURG, PENNSYLVANIA.

FUSIBLE SAFETY DEVICE.

Application filed November 24, 1924. Serial No. 751,875.

The present invention relates broadly to safety devices, and more particularly to fusible safety devices of the character especially adapted for use in connection with hot water storage heating systems.

It has heretofore been proposed in the art to which the present invention relates to provide fusible saftey devices adapted to be operated under predetermined temperature conditions to effect a cutting off of the fuel supply in order to prevent undue temperature conditions such as might endanger the installation. The present invention has for one of its objects an improvement in a device of this character adapted to be used in conjunction with a controlling valve of the diaphragm type whereby the device may be used without modification in systems or installations of different capacities.

In the accompanying drawings there is shown for purposes of illustration only, a preferred embodiment of the present invention, it being understood that the drawings do not define the limits of the invention as changes in the construction and operation disclosed therein may be made without departing either from the spirit of the invention or the scope of my broader claims.

In the drawings:—

Figure 1 is a side elevation, partly broken away, of one form of installation embodying the present invention;

Figure 2 is a detail view partly broken away and partly in section, and on an enlarged scale, illustrating the construction of a preferred embodiment of the invention, and Figure 3 is a detail view of the fusible link and its operating connections.

In carrying out the present invention there may be provided a storage tank 2, of any usual or well known construction, having a heater 3 with circulating pipes 4 and 5 for delivering relatively cool water to the heater and heated water to the storage tank, respectively.

For supplying the combustible fluid to the heater, there is shown a supply line 6 having interposed therein a control valve and casing 7 of the diaphragm type. This valve has an inlet connection 8 and an outlet connection 9, the flow between said connections being controlled by a diaphragm 10.

Extending from the valve casing above the diaphragm is a by-pass 11, having positioned therein a controlling valve 12 adapted to be operated by a suitable thermostat 13 extending into the body of water within the storage tank. The construction is such that upon expansion of the thermostatic element the valve 12 will be closed to prevent the escape of gas from the valve casing above the diaphragm. This by-pass 11 may terminate at any desired point, but is preferably extended to a point within the heater and adjacent one of the burners therein whereby any escaping gas will be ignited.

Communicating with the valve casing so as to receive a constant supply of combustible from the pipe 6, is a pilot connection 14, this connection preferably being controlled by a manually operable valve 15 whereby a pilot flame of the desired conditions may be maintained. The outlet connection from the valve 7 in turn communicates with a main burner 16 for effecting heating of the water.

Mounted within the diaphragm valve casing is a plunger 17, normally urged toward the diaphragm by a compression spring 18. The strength of the spring is such that irrespective of the flow conditions through the valve, the spring will be effective upon release of the plunger 17 for moving the plunger downwardly to the extent required for moving the diaphragm to a position in which it will cut off communication between the connections 8 and 9. For normally holding the plunger in a predetermined position and preventing such operation of the spring 18 there is provided a holding wire 19 passing through an opening 20 in the upper end of the plunger and threaded through openings 22 in the curved leaves 23. These leaves are adapted to extend around and be thermally influenced by a suitable heat conducting body, preferably an extended shoulder 24 on the thermostat 13, and be held in such position by fusible solder 25, preferably in the form of drops. By reason of this construction it will be apparent that if, for any reason, the temperature conditions within the storage tank 2 should rise above the melting point of the fusible solder 25, this temperature will be communicated to the solder by the shoulder on the thermostat, whereby the solder will melt and release the plunger 17, thereby permitting it to effect closing of the diaphragm.

In order to facilitate resetting of the parts, the plunger 17 is provided with a second opening 25$^a$ adapted to receive a wire, nail or the like, for holding the plunger in elevated position while the leaves 23 are being resoldered.

The diaphragm 10 may be provided with the usual port 26 whereby with the valve 12 in closed position, gas or other combustible will pass from the inlet connection through the port 26 and thereby build up an operating pressure above the diaphragm sufficient to effect closing thereof. After the diaphragm has been closed, it will remain closed until the thermostat operates to open the valve 12 to permit the escape of the pressure from the valve casing above the diaphragm. The plunger 17, however, is effective at all times for moving the diaphragm to closed position, irrespective of the fluid pressure conditions on either side thereof.

It will be understood that a standard plunger installation of the character herein shown may be applied to diaphragms of different sizes, thereby adapting a standard safety device to installations of different capacities.

The advantages of the present invention arise from the provision of a safety device of this character adapted to be used with diaphragms of different sizes and construction, and effective for moving the diaphragm to cutting off position at any instant during the operation thereof.

I claim:

1. In a hot water heating system of the storage type, a storage tank, a heater for said tank, a burner for said heater, a valve controlling the fuel supply to said burner, a shouldered thermostat controlling the operation of said valve, and fusible means operatively cooperating with the shoulder on said thermostat and with said valve for effecting closing of the valve under predetermined temperature condition, substantially as described.

2. In a hot water heating system of the storage type, a storage tank, a heater for said tank, a burner for said heater, a diaphragm valve controlling the fuel supply to said burner, a shouldered thermostat controlling the operation of said valve, and fusible means operatively cooperating with the shoulder on said thermostat and with said valve for effecting closing of the valve under predetermined temperature condition, substantially as described.

3. In a hot water heating system of the storage type, a storage tank, a heater for said tank, a burner for said heater, a valve controlling the fuel supply to said burner, a shouldered thermostat controlling the operation of said valve, and fusible means operatively cooperating with the shoulder on said thermostat and with said valve for effecting closing of the valve under predetermined temperature condition, said plunger being provided with means facilitating resetting thereof, substantially as described.

4. In a safety device, a valve, a plunger normally urged in one direction for effecting closing of the valve, a holding wire engaging said plunger, and fusible means to which said holding wire is operatively attached, said fusible means comprising a pair of separable leaves having a fusible connection and a thermostat by which said leaves are thermally influenced, substantially as described.

5. In a safety device, a freely operable valve, means controlling the normal operation of said valve, and temperature-controlled means adapted upon release to prevent normal operation of said valve, said temperature-controlled means including a change of section intermediate its ends whereby it may be engaged by temporary holding means and held in open inoperative position irrespective of temperature conditions.

6. In a safety device, a freely operable valve, temperature responsive means controlling the normal operation of said valve, a fusible tension means responsive to excessively high temperatures only and adapted upon release to prevent any subsequent normal operation of said valve under the action of said temperature responsive means while the fusible means is released, said fusible means being constructed for replacement manually as required, substantially as described.

7. In a safety device, a freely operable valve, means controlling the normal operation of said valve, and temperature controlled means adapted upon release to prevent normal operation of said valve, said temperature controlled means including a spring and means adapted to temporarily cooperate with said spring for rendering it inactive whereby the temperature controlled means may be held in inoperative position irrespective of temperature conditions, said last mentioned means including a movable member having an opening for the reception of a retaining pin, substantially as described.

In testimony whereof I have hereunto set my hand.

GEORGE A. ROBERTSHAW.